(12) United States Patent
Schilling (10) Patent No.: US 6,353,627 B1
(45) Date of Patent: Mar. 5, 2002

(54) HIGH DATA RATE SPREAD-SPECTRUM SYSTEM AND METHOD

(75) Inventor: Donald L. Schilling, Sands Point, NY (US)

(73) Assignee: Linex Technologies, Inc., West Long Branch, NJ (US)

( * ) Notice: Subject to any disclaimer, the term of this patent is extended or adjusted under 35 U.S.C. 154(b) by 0 days.

(21) Appl. No.: 09/186,246

(22) Filed: Nov. 4, 1998

(51) Int. Cl.[7] .......................... H04B 15/00; H04K 1/00; H04L 27/30
(52) U.S. Cl. ..................... 375/130; 375/133; 375/135; 375/136
(58) Field of Search .................. 375/130, 133, 375/134, 135, 136, 150, 152, 316, 343, 267, 261, 262, 347, 348; 370/335, 342, 441

(56) References Cited

U.S. PATENT DOCUMENTS

| | | | | |
|---|---|---|---|---|
| 5,862,133 A | * | 1/1999 | Schilling | 370/342 |
| 6,038,253 A | * | 3/2000 | Shimazaki | 375/224 |
| 6,061,359 A | * | 5/2000 | Schilling et al. | 370/441 |

OTHER PUBLICATIONS

Masao Nakagawa and Takaaki Hasegawa, "Spread Spectrum for Consumer Communications—Applications of Spread Spectrum Communications in Japan" IEICE Trans. Commun., vol. J74–B–I, No. 5, pp. 1093–1102, May 1991.

* cited by examiner

Primary Examiner—Mohammad H. Ghayour
(74) Attorney, Agent, or Firm—David Newman Chartered (57) ABSTRACT

A high data rate, high processing gain, direct sequence spread spectrum system that transmits a BPSK or QPSK signal. The system FEC encodes and interleaves data which are collected and stored and forwarded N bits at a time by transmitting one of $2^N$ pseudo random waveforms every time N bits are collected. The $2^N$ pseudo random waveforms can be sent as an orthogonal, bi-orthogonal, or nearly orthogonal waveform. During acquisition, a plurality of product devices multiply a received spread-spectrum signal by a header chip-sequence signal. In each case, the header chip-sequence signal has a different delay, with each delay being at most one chip. Acquisition can also be achieved using a matched filter. After acquisition, the plurality of product device multiply the received spread-spectrum signal by $2^N$ chip-sequence signals to generate a plurality of products, with each chip-sequence signal of the plurality of chip-sequences signals being different from other chip-sequence signals of the plurality of chip-sequence signals; a plurality of integrators integrate the plurality of products thereby forming $2^N$ correlators, and a comparator selects a largest value from the plurality of integrators. The largest value is decoded into N bits of data. This process is repeated for each N bit word received.

4 Claims, 5 Drawing Sheets

FIG.8

HIGH DATA RATE SPREAD-SPECTRUM SYSTEM AND METHOD

BACKGROUND OF THE INVENTION

This invention relates to communications, and more particularly to a high data rate spread-spectrum system.

DESCRIPTION OF THE RELEVANT ART

In a fixed bandwidth CDMA system, increasing the data rate reduces the processing gain. To maintain a high data rate, the prior art teaches the transmission of spread-spectrum signals with parallel orthogonal chip-sequence signals. The use of parallel chip-sequence signals, however, results in increased interference in the receiver due to multipath. In addition, when transmitting parallel chip-sequence signals, the transmitted output signal usually is distorted as a result of nonlinearities in the output amplifiers and filters.

Figure 1:
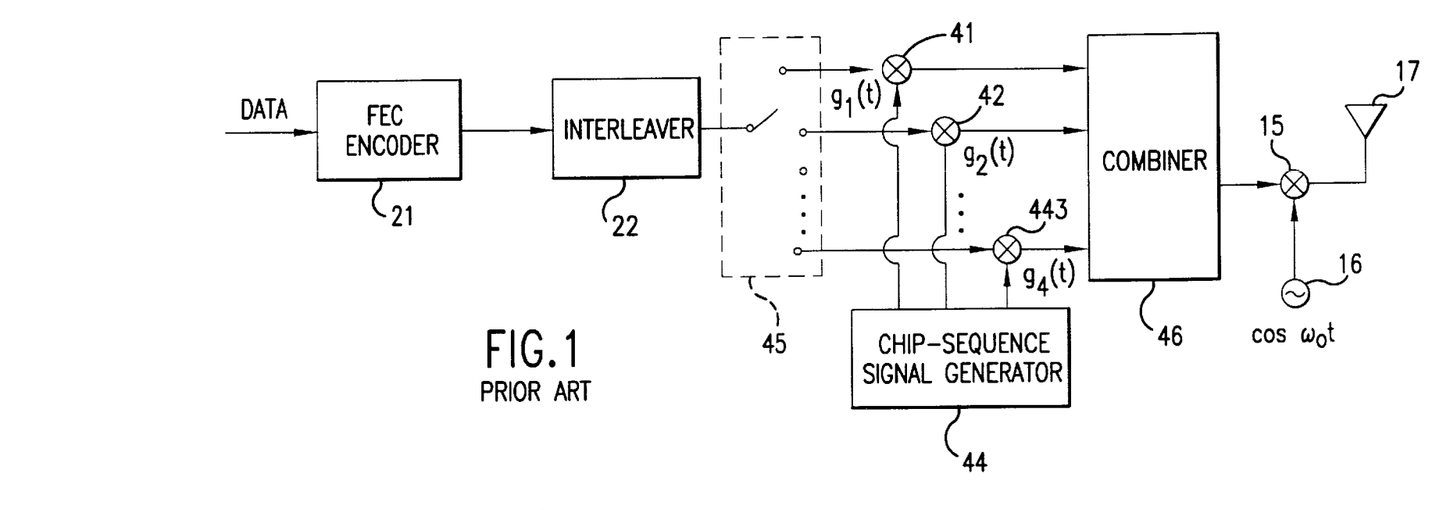
FIG. 1 illustrates a prior art approach for transmitting data at a high rate in a CDMA system.
Figure 2:
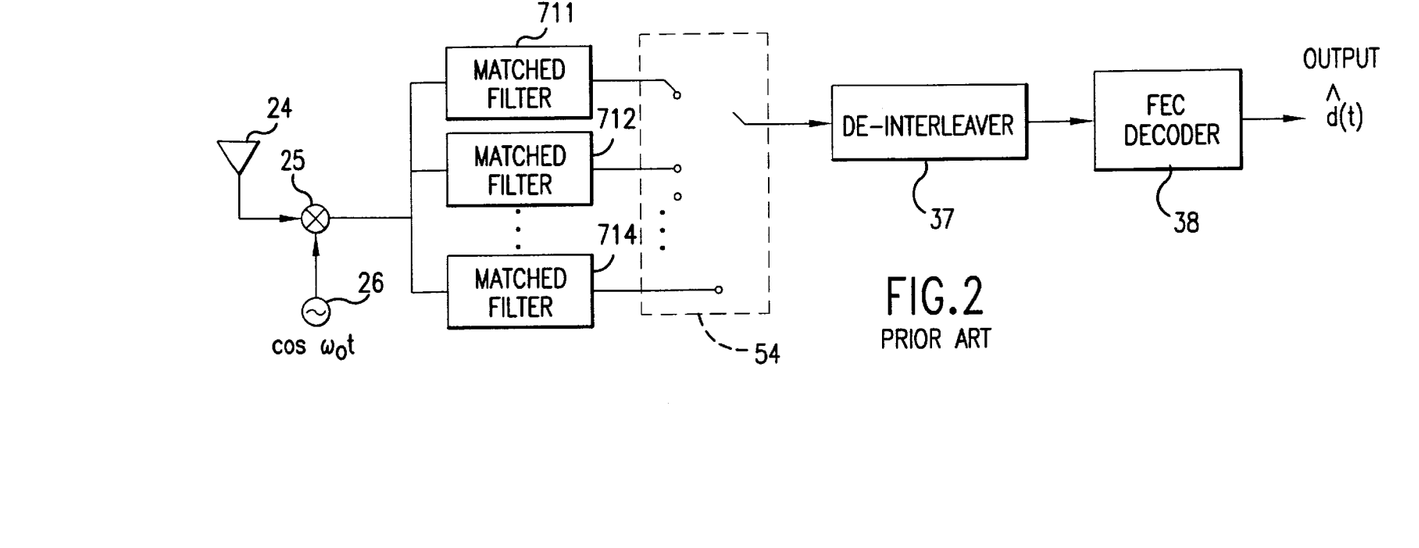
FIG. 2 illustrates a prior art approach for receiving data at a high rate in a CDMA system.

FIGS. 1 and 2 show a prior art spread-spectrum system, transmitting data at high processing gain. The example is for an encoded data rate of 100 megabits per second (Mb/s), although any data rate could be used. The data are demultiplexed by demultiplexer 45 into four data streams, each with a symbol rate of 25 mega-symbols/second. Four product devices 41, 42, 443, multiply the four data streams by four orthogonal chip-sequence signals $g_1(t), \ldots, g_4(t)$, from chip-sequence generator 44, which have a chip rate of 400 mega-chips/second. The four chip-sequence signals could be sent as five-level pulse amplitude modulation (PAM), by multiplying by $\cos\omega_o t$ or as three amplitudes in each of $\cos\omega_o t \sin\omega_o t$ axes. The outputs from the product devices 41, 42, 443 are combined by combiner 46, and transmitted as a radio wave, at a carrier frequency $\omega_o$, over a communications channel. Signal source 16 and product device 15 translate the output from combiner 46 to the carrier frequency, using a standard up-converter device. The antenna 17 is coupled to the radio wave to the communications channel.

The receiver has four matched filters 711, 712, 714 for detecting the four parallel signals. At the receiver, antenna 24, product device 25 and receiver signal source 26 receive and translate the multichannel spread-spectrum signal to a processing frequency. The multiplexer 54 multiplexes the outputs from the matched filters 711, 712, 714. De-interleaver 37 de-interleaves the multiplexed data, and FEC decoder 38 decodes the de-interleaved data as estimated data.

Multipath causes delayed versions of $g_1(t), g_2(t), g_3(t)$ and $g_4(t)$ to be present at each matched filter. Consider the first matched filter 711. The delayed versions are not orthogonal to the first chip-sequence signal $g_1(t)$ and multipath interference results. The number of interferers is due to the number of parallel codes, number of simultaneous users, etc.

Further, any multipath signals can be generated by each of the multilevel pulse amplitude modulation signals, which can produce one of M levels for each chip. The number of levels produced is M. This large variation in amplitude results in distortion due to filtering and to nonlinearities in the trasmit output amplifier.

SUMMARY OF THE INVENTION

A general object of the invention is to facilitate the transmission and reception of a high data rate signal using a high processing gain CDMA system without using parallel codes.

A second object is the efficient acquisition and synchronization of such a signal.

According to the present invention, as embodied and broadly described herein, an improvement to a spread-spectrum system is provided for sending data over a communications channel. The spread-spectrum system is assumed to handle high data rate communications. The improvement includes, at the transmitter, a memory which typically is coupled to a bit interleaver, and a chip-sequence encoder, which is coupled to the memory and to a transmitter section. At the receiver, the improvement includes a plurality of product devices, a plurality of integrators, a comparator, and a chip-sequence-signal generator and controller.

At the transmitter, the memory stores N bits of interleaved data, or other data, from an interleaver, or other data source, respectively. The chip-sequence encoder uses the N bits of stored data for selecting one of $2^N$ orthogonal chip-sequence signals stored in the chip-sequence encoder. The chip-sequence encoder outputs the selected chip-sequence signal. The number of bits, N, is the number of bits in a symbol, used for selecting one of the $2^N$ chip-sequence signals. While orthogonal signals are preferred, near-orthogonal signals also can be employed, albeit at the cost of a slightly higher error rate.

At the receiver, at the processing frequency, $2^N$ correlators are employed, one for each of the $2^N$ possible signals. The outputs from the $2^N$ correlators are compared, and the output with the largest value is chosen. $2^N$ matched filters also could be employed, however, using matched filters is not a preferred approach since $2^N$ matched filters would require more gates, and therefore more cost.

For acquisition, the $2^N$ product devices multiplies the received header of the spread-spectrum signal by a replica of the header signal, which is stored or generated at the receiver, and which typically is taken from the plurality of $2^N$ chip-sequence signals. Each correlator is delayed, one from the other, by one-half chip in a preferred system. The chip-sequence signal has the first chip-sequence signal, and has a delay of at least one chip with respect to each chip-sequence signal from the plurality of $2^N$ chip-sequence signals. Each chip-sequence signal has a different delay from other chip-sequence signals from the plurality of $2^N$ chip-sequence signals. Timing is obtained by using the timing of the correlator with the largest output.

The plurality of product devices, after acquisition, multiplies the received spread-spectrum signal by the plurality of $2^N$ chip-sequence signals, with each chip-sequence signal from the plurality of $2^N$ chip-sequence signals having a different chip-sequence signal from other chip-sequence signals from the plurality of $2^N$ chip-sequence signals. The plurality of integrators are coupled to the plurality of product devices, respectively. The plurality of integrators integrate a plurality of products from the plurality of product devices during the period of a chip-sequence signal. The comparator, which is coupled to the plurality of integrators, selects a largest value from the plurality of integrators. The chip-sequence decoder decodes the largest value from a respective integrator of the plurality of integrators into N bits of data or interleaved data, depending on the originating source at the transmitter.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The invention disclosed in this patent is a novel approach to increasing data rate over a spread-spectrum system. The claimed invention may be manufactured, in whole or in part, as a digital signal processor (DSP), as an application specific integrated circuit (ASIC), from a general purpose processor, from discrete and/or analog electronic components, or as a combination of one or more of the DSP, ASIC, general purpose processor and discrete and/or analog components.

The present invention broadly includes FEC means, interleaver means, memory means, chip-encoder means, transmitter means, receiver means, spread-spectrum means, comparator means, chip-decoder means, deinterleaver means, and FEC-decoder means. The interleaver means is coupled between the FEC-encoder means and the memory means. The chip-encoder means is coupled between the memory means and the transmitter means. The transmitter means is coupled to the communications channel.

The receiver means is coupled to the communications channel. The spread-spectrum means is coupled between the receiver means and the comparator means. The chip-decoder means is coupled between the comparator means and the deinterleaver means.

The FEC-decoder means is coupled to the deinterleaver means. The FEC-encoder means encodes with an FEC code, the data as FEC data. FEC data, as used herein, are the encoded data from any data source which are at the output of the FEC-encoder means.

The interleaver means interleaves the FEC data as interleaved data. The memory means stores N bits of interleaved data as stored data. As used herein, stored data are the data stored in the memory means. N is the number of bits in a particular symbol.

The chip-encoder means selects a chip-sequence signal, based on the N bits of stored data, from one of $2^N$ chip-sequence signals stored in the chip-encoder means. The selected chip-sequence signal is an output chip-sequence signal. In a preferred system, the $2^N$ chip-sequence signals are orthogonal and each chip-sequence signal has $2^N$ chips. Alternatively, $2^N/2$ orthogonal chip-sequence signals can be selected and each chip-sequence signal can be sent as a positive or negative signal, creating bi-orthogonal signaling.

The transmitter means translates the output chip-sequence signal to a carrier frequency and transmits the output chip-sequence signal at the carrier frequency as a radio wave over a communications channel, as a binary phase-shift-keyed (BPSK) or as a quaternary phase-shift-keyed (QPSK) spread-spectrum signal.

The receiver means translates the spread-spectrum signal received to a processing frequency. Because of the ease of digital processing, a preferred procedure is to translate, or down convert, the received spread-spectrum signal to baseband.

The spread-spectrum means, for acquisition, multiplies the received spread-spectrum signal by a plurality of "header" chip-sequence signals. Each header chip-sequence signal has an identical chip sequence. Each header chip-sequence signal has a different delay from the other header chip-sequence signals. The preferred delay is one-half chip duration, although one chip duration is also workable. This accomplishes acquisition, by multiplying the received spread-spectrum signal by an identical chip-sequence signal, with different delays. The output of each multiplier is added forming a correlation, and the correlator with the largest output is selected. This approach permits the same $2^N$ correlators used for demodulation to be used for acquisition by changing the multiplying signals. A matched filter, however, could be used for acquisition, but using a matched filter would increase hardware. Using a matched filter as a separate circuit for acquisition, which would be in addition to the embodiment disclosed herein, is well know in the art.

After acquisition, the spread-spectrum means changes from multiplying by an identical "header" chip-sequence signal to multiplying by the $2^N$ different chip-sequence signals of the plurality of $2^N$ chip-sequence signals. Accordingly, after acquisition, the received spread-spectrum signal is multiplied by each of the chip-sequence signals in the plurality of chip-sequence signals, with each chip-sequence signal in the plurality of chip-sequence signals having a different chip sequence from other chip-sequence signals from the plurality of chip-sequence signals. The outputs of each multiplier is added so that each multiplier-adder is a correlator.

The comparator means selects the largest value at the output of the spread-spectrum means at each symbol time $T_s$.

The decoder means 36 decodes the largest value from the comparator means as an N-bit sequence or series of N-bits.

The deinterleaver means deinterleaves the series of bits from chip-decoder means to deinterleaved data, and the FEC-decoder means decodes the deinterleaved data as estimated data.

The data, d(t), are FEC encoded and interleaved, and successive N bits are stored. Each N bit sequence is considered a symbol. For each N bits, one of $2^N$ orthogonal sequences is selected. Each sequence has $2^N$ chips/symbol. Each sequence is then amplitude modulation (AM) modulated. Thus the following signal is sent:

$$k_i(t)\cos \omega_o t$$

$$i=1, 2, \ldots, 2^N$$

or $$k_i(t)\cos \omega_o t + h_j(t)\sin\omega_o t$$

$$i=1, 2, \ldots, 2^N/2$$
$$j=1, 2, \ldots, 2^N/2$$

Alternatively, bi-orthogonal signaling may be used by sending $$p_i(t)\cos \omega_o t$$

$$i=1, 2, \ldots, 2^N/2$$

or $$\pm g_i(t)\cos \omega_o t \pm h_j(t)\cos \omega_o t$$

$$i=1, 2, \ldots, 2^N/4 \quad j=1, 2, \ldots, 2^N/4$$

where each waveform is orthogonal or bi-orthogonal to the others. In the receiver, $2^N$ correlators are used. If bi-orthogonal coding were used, then $2^{N-}$correlators are required.

The relevant formulas are:

Processing Gain (PG)=$2^N$ chips/symbol $f_s=f_b/N$ $f_c=2^N f_s=2^N/Nf_b$

Where $f_b$ is frequency (bandwidth) of bits, $f_c$ is frequency (bandwidth) of chips, and $f_s$ is frequency (bandwidth) of symbols.

Figure 3:
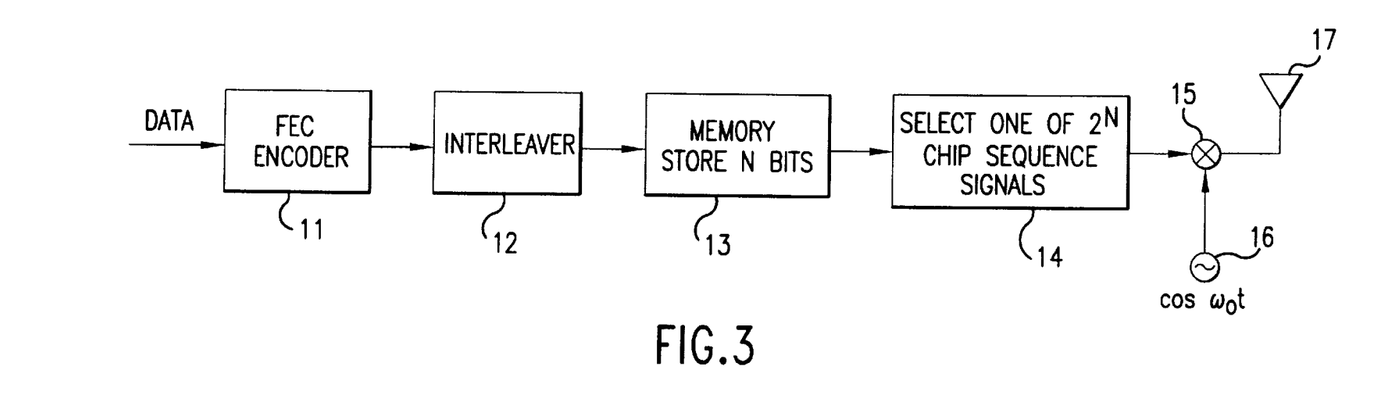
FIG. 3 is a block diagram of a transmitter for increasing processing gain in a high data rate system for orthogonal BPSK.
Figure 4:
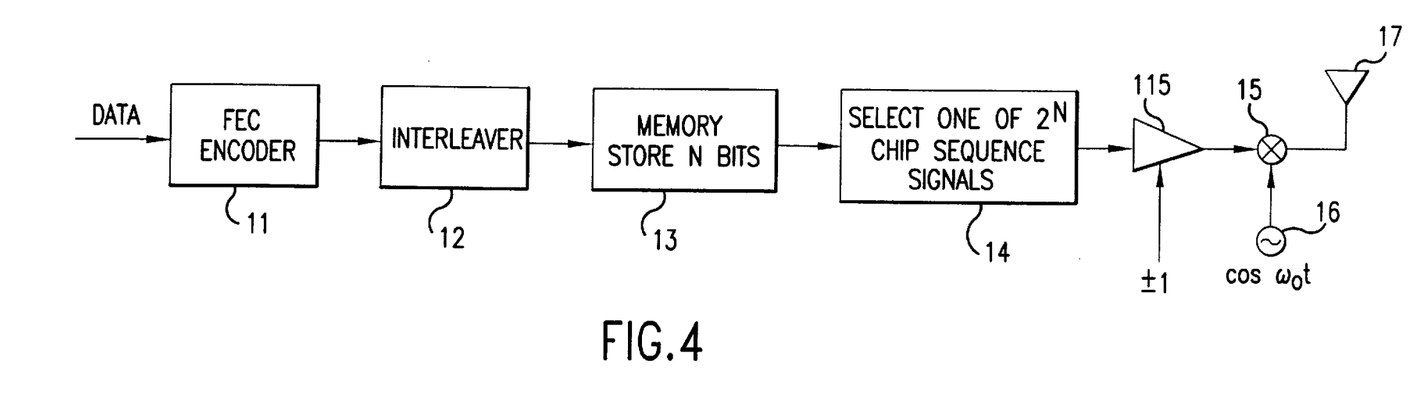
FIG. 4 is a block diagram of a transmitter for increasing processing gain in a high data rate system for bi-orthogonal BPSK.

The number of correlators, or matched filters, needed are:
$2^N/N$ for orthogonal coding
$2^N/2N$ for bi-orthogonal coding
For example:
$f_b$=100 Mb/s
and PG=16
Then $16=2^N$ and N=4
$f_s=f_b/N$=25 MHz
and $f_c$=400 MHz
N=4 for orthogonal coding
N=2 for bi-orthogonal coding In the exemplary arrangement shown in FIGS. 3–6, the improvement to the transmitter includes, by way of example, a forward-error-correction (FEC) encoder 11, interleaver 12, and memory 13. In FIGS. 3 and 4, a chip-sequence encoder 14 is employed for selecting one of $2^N$ chip-sequence signals. The transmitter section, in FIGS. 3 and 4, includes a product device 15, a signal source 16, and an antenna 17. Additional amplifiers and filters may be employed in the transmitter section, as is well known in the art. The interleaver 12 is coupled between the FEC encoder 11 and the memory 13. The chip-sequence encoder 14 is coupled between the memory 13 and the product device 15. The signal source 16 is coupled to the product device 15, and the antenna 17 is coupled to the product device 15.

The FEC encoder 11, of FIGS. 3–6, encodes the data with an FEC code. A convolutional encoder, concatenated coder comprising a convolutional and a Reed Solomon (RS) encoder, or other error-correcting codes can be used. The output of the FEC encoder 11 is denoted herein as FEC data.

The interleaver 12 interleaves the FEC data, using a bit interleaver algorithm as is well known in the art. The output of the interleaver 12 is denoted herein as interleaved data.

The memory 13 stores N bits of data. The data may come from the interleaver 12, and from other sources, such as signaling and other overhead data into the memory 13. The data stored in the memory 13 is denoted herein as stored data. The number N represents the number of bits per symbol. The symbols are used or represented for a particular chip-sequence at the chip-sequence encoder 14.

Referring to FIGS. 3 and 4, the chip-sequence encoder 14 uses N bits of stored data for selecting a particular chip-sequence signal from a plurality of chip-sequence signals. The plurality of chip-sequence signals, in a preferred embodiment, includes $2^N$ orthogonal chip-sequence signals. The $2^N$ chip-sequence signals are stored in the chip-sequence encoder 14. In response to the N bits of data stored each symbol time $T_s$, one of the $2^N$ signals is outputted from the chip-sequence encoder 14. The output of the chip-sequence encoder 14 is denoted herein as an output chip-sequence signal. In FIG. 4, the output of the chip-sequence encoder 14 is multiplied by gate 115 with a plus or minus one, to generate a bi-orthogonal BPSK signal.

Figure 5:
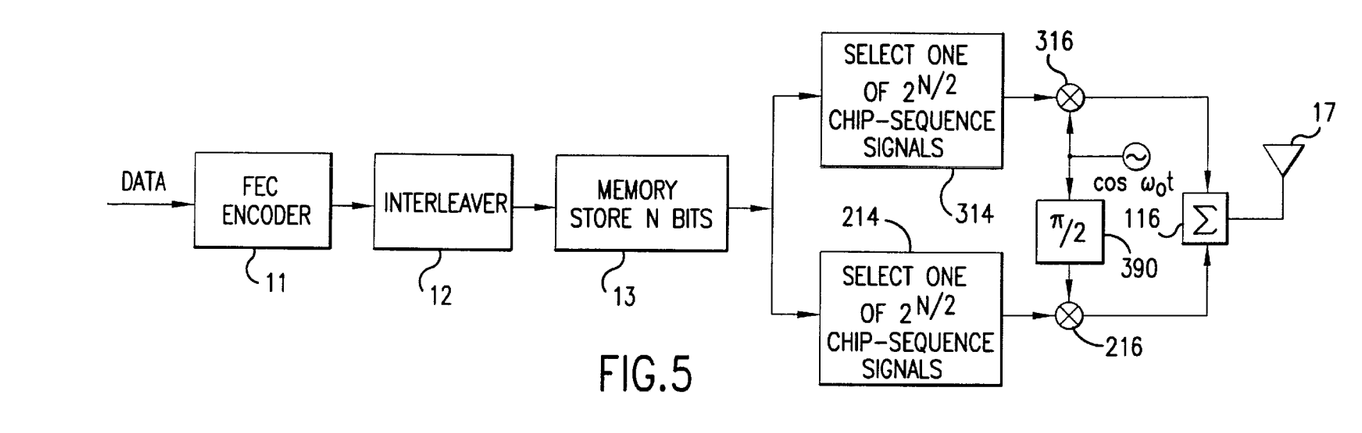
FIG. 5 is a block diagram of a transmitter for increasing processing gain in a high data rate system for orthogonal QPSK.
Figure 6:
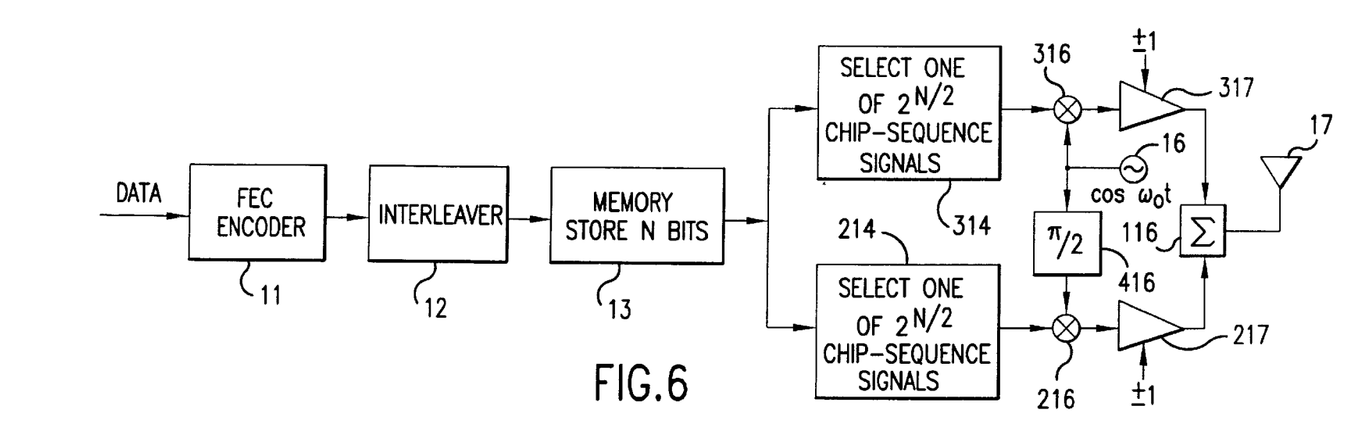
FIG. 6 is a block diagram of a transmitter for increasing processing gain in a high data rate system for bi-orthogonal QPSK.

Referring to FIGS. 5 and 6, the chip-sequence encoders 214, 314 uses $2^N/2$ bits of stored data for selecting a particular chip-sequence signal from a plurality of chip-sequence signals. The plurality of chip-sequence signals, in a preferred embodiment, includes $2^N/2$ bi-orthogonal chip-sequence signals. The $2^N/2$ chip-sequence signals are stored in the chip-sequence encoders 214, 314. In response to the N bits of data stored each symbol time $T_s$, one of the $2^N/2$ signals is outputted from the chip-sequence encoders 214, 314. The output of the chip-sequence encoder 214 is denoted herein as a quadrature-phase output chip-sequence signal, and the output from the chip-sequence encoder 314 is denoted herein as an in-phase chip-sequence signal. The signal source 16 generates an in-phase carrier signal, and phase shifter 416 generates the quadrature-phase carrier signal, as is well known in the art.

In FIG. 6, the outputs of the chip-sequence encoders 214, 314 are multiplied by multiplier devices 216, 316, respectively, by the quadrature-phase carrier signal and the in-phase carrier signal, and by gates 217, 317, respectively, with a plus or minus one, to generate a bi-orthogonal QPSK signal.

The transmitter section translates the output chip-sequence signal to a carrier frequency, and transmits, as a radio wave, the output chip-sequence signal at the carrier frequency over a communications channel. The transmitted signal is a spread-spectrum signal.

At the transmitter section in FIGS. 3 and 4, the signal source 16 generates the signal for translating the output chip-sequence signal to the particular carrier frequency, and the product device 15 multiplies the output chip-sequence signal to the carrier frequency. The resulting product is the spread-spectrum signal which is radiated by the antenna 17. For FIGS. 3 and 4 the product device 15 and signal source 16 are shown for an in-phase carrier.

At the transmitter section in FIGS. 5 and 6, the signal source 16 generates the signal for translating the output chip-sequence signal to the particular carrier frequency, and the product devices 216, 316 multiplies the output chip-sequence signal to the carrier frequency. The phase-shift device 416 generates the quadrature component from the signal source 16. The resulting product is the spread-spectrum signal which is radiated by the antenna 17. Note that in FIGS. 5 and 6, a set of quadrature carriers, cos $\omega_o t$ and sin$\omega_o t$, are generated in place of a simple in-phase carrier, of FIGS. 3 and 4.

Figure 7:
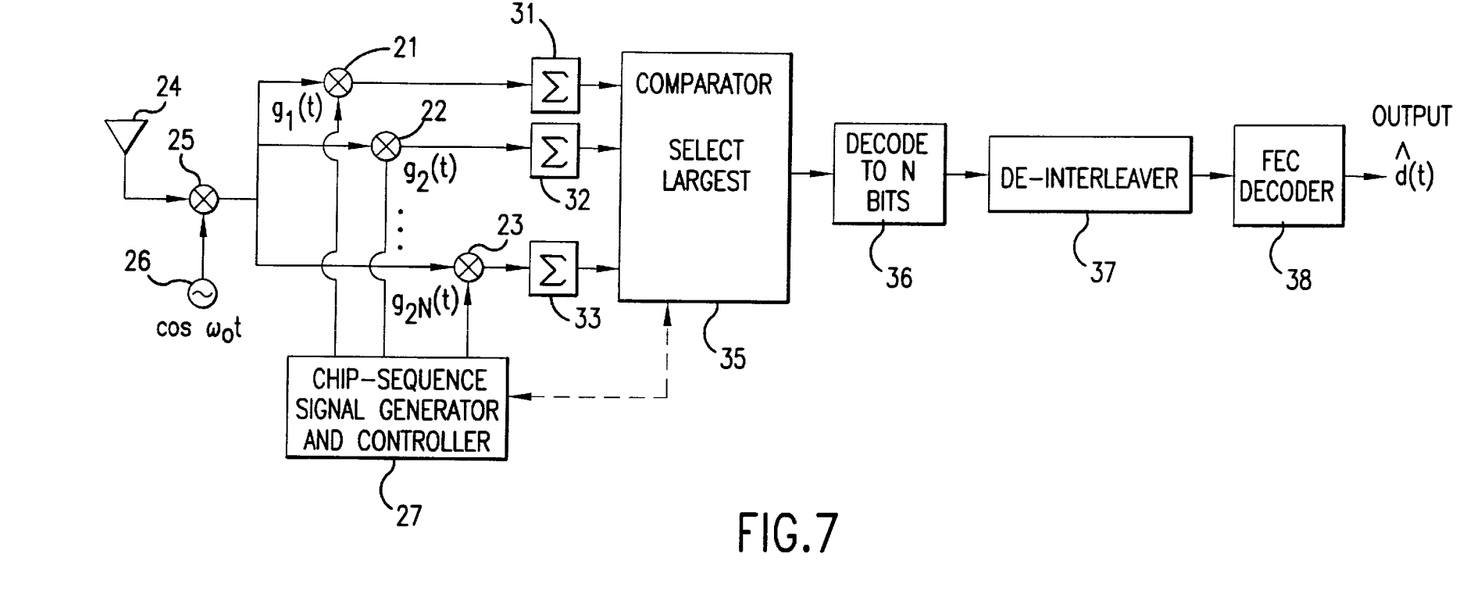
FIG. 7 is a block diagram of a receiver for increasing processing gain in a high data rate system for BPSK.

FIG. 7 shows how the basic receiver circuit, shown in FIG. 2, is modified by the addition of a sequence detector that detects a symbol header. This decoder could be a simple matched filter which operates on the symbols.

Figure 8:
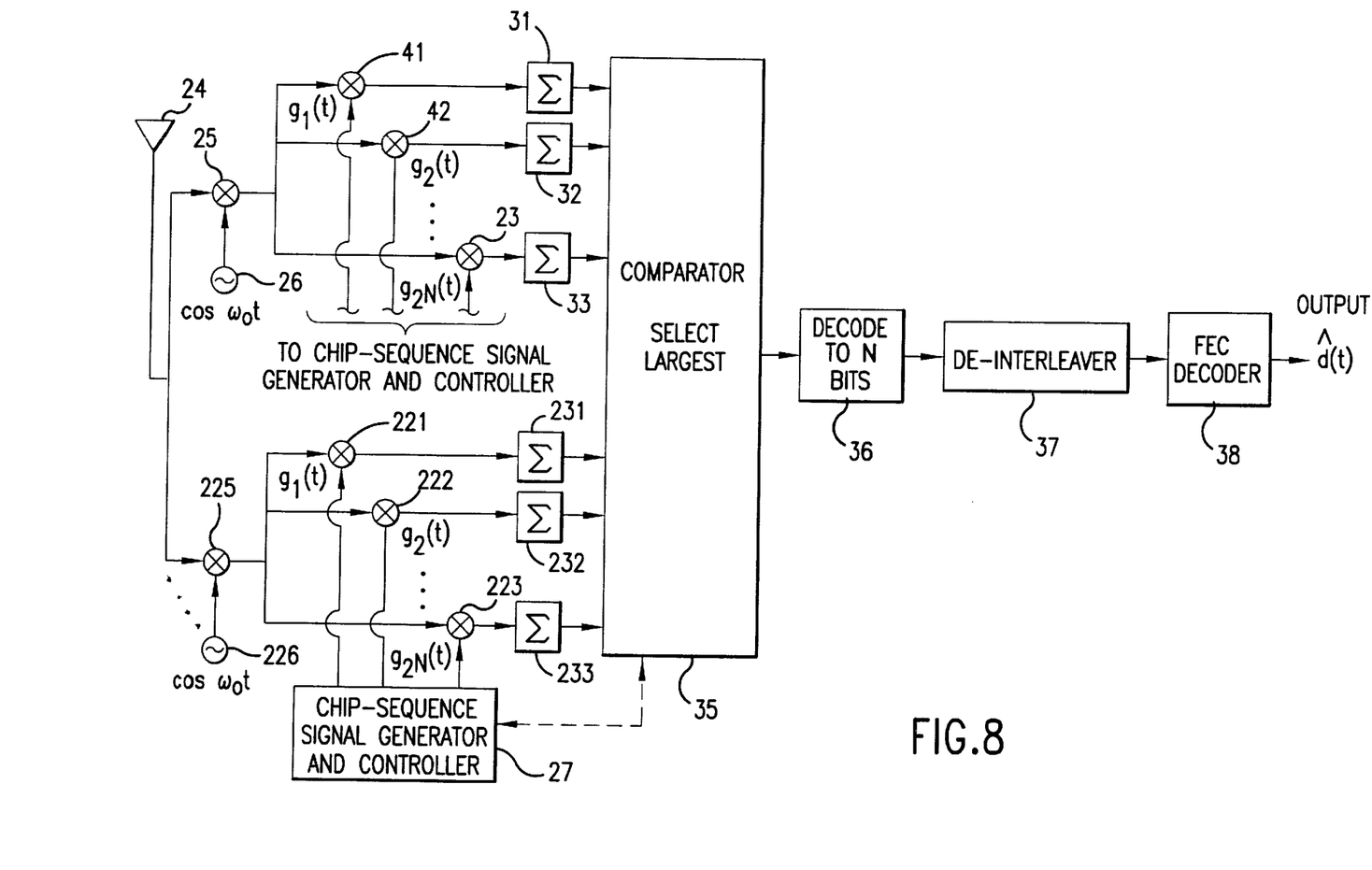
FIG. 8 is a block diagram of a receiver for increasing processing gain in a high data rate system for QPSK.

At the receiver, the receiver section translates the spread-spectrum signal to a processing frequency. The receiver section has an antenna 24 which is coupled to the communications channel, and a signal source 26. The signal source 26 generates a signal which translates the received spread-spectrum signal by the mixer or product device 25, to the processing frequency. In practice, as shown in FIG. 8, two quadrature terms are obtained by multiplying by cos $\omega_o t$ and sin $\omega_o t$ and using standard receiver circuits. FIG. 8 illustrates an in-phase device 25 and a quadrature-phase device 225, coupled to a signal source 26 for cos $\omega_o t$ and a signal source 226 for sin $\omega_o t$. Alternatively, a single signal source and a phase shifter could be use to generate the cos $\omega_o t$ and sin $\omega_o t$ signals.

In FIG. 7, the plurality of product devices 21, 22, 23 are coupled to the product device 25. The plurality of product devices 21, 22, 23 operates in cooperation with the chip-sequence-signal generator and controller 27. For acquisition, a "header" chip-sequence signal is generated by the chip-sequence-signal generator and controller 27. The header chip-sequence signal is generated as a plurality of header chip-sequence signals, with each chip-sequence signal in the plurality of header chip-sequence signals having a delay of one-half chip or one chip delay with respect to each other chip-sequence signal in the plurality of header chip-sequence signals. Thus, each of the header chip-sequence signals in the plurality of header chip-sequence signals has an identical chip sequence as the first chip-sequence signal, but with a different delay. The plurality of product devices 21, 22, 23 multiplies the received spread-spectrum signal by the plurality of header chip-sequence signals, each with a respective, different delay. At the output of the plurality of product devices 21, 22, 23, the plurality of integrators 31, 32, 33 integrates, respectively, a plurality of products from the plurality of product devices 21, 22, 23. The products are integrated for a period of a header-chip-sequence signal.

The quadrature detection embodiment of FIG. 8 operates functionally equivalent to the in-phase embodiment described for FIG. 7, with the addition of quadrature-phase products devices 221, 222, 223 and quadrature-phase integrators 231, 232, 233. A set of a product device 21 and an integrator 31, comprise a correlator, as is well known in the art.

The comparator 35 selects a largest value from the plurality of integrators 31, 32, 33, and for the quadrature-phase embodiment, of FIG. 8, also from the plurality of integrators 31, 32, 33, 231, 232, 233. When the largest value is selected by the comparator 35, a control signal is sent to the chip-sequence signal-generator and controller 27, as to which of the particular paths from the plurality of product devices 21, 22, 23 and the respective plurality of integrators 31, 32, 33 has the largest value. The chip-sequence-signal generator and controller 27 locks onto the timing of the selected signal path.

Alternatively, a separate matched filter receiver could be used to detect the header and achieve synchronization.

When the chip-sequence-signal generator and controller 27 are locked into the timing, the chip-sequence-signal generator and controller 27 generates a plurality of chip-sequence signals, with each chip-sequence signal different from the other chip-sequence signals in the plurality of chip-sequence signals and each being one of the $2^N$, or $2^N/2$, possible transmitted signals. Thus, each chip-sequence signal from the chip-sequence-signal generator and controller 27 is different from the other chip-sequence signals in the plurality of chip-sequence signals, by having a different chip sequence from other chip-sequence signals. The plurality of chip-sequence signals are fed to the plurality of product devices 21, 22, 23, in time synchronization with the received spread-spectrum signal, since acquisition has been achieved.

Acquisition is achieved by transmitting a prescribed number of chips to form the header. For example, if the desired signal-to-noise ratio (SNR) at the correlator output for a single sequence were 20 dB, and the SNR of a chip were −10 dB, then a sequence of 1000 chips is adequate. In this case, assuming a chip rate of 4 Megachips/second, the acquisition time $T_A$=(1000/4) microseconds=250 microseconds.

After acquisition, the plurality of product devices 21, 22, 23, the chip-sequence-signal generator and controller 27, and plurality of integrators 31, 32, 33 serve to demodulate which chip-sequence signal is embedded in the received spread-spectrum signal. The strongest signal path from the plurality of integrators 31, 32, 33 is selected by comparator 35 as the detected signal. Upon detecting a particular chip-sequence signal from a particular path, the selected chip-sequence signal is decoded to N bits by chip decoder 36. The de-interleaver 37 deinterleaves the interleaved N bits and the FEC decoder decodes the deinterleaved data. An estimate of data is output from the FEC decoder 38.

To ensure timing accuracy, the system could sample two or more times per chip. For data rates between 64 kb/s and 2 Mb/s, technology permits sampling at four times the chip rate.

However, at data rates of 100 Mb/s and a chip rate of 400 Mchips/s, one or two samples per chip appears to be the technological limit today.

FIG. 8 shows that quadrature detection is actually employed.

The present invention also includes a spread-spectrum method improvement for sending data over a communications channel, comprising the steps of storing, at a transmitter, N bits of interleaved data as stored data, with N a number of bits in a symbol, and selecting, at the transmitter in response to the N bits of stored data, a chip-sequence signal from a plurality of chip-sequence signals, as an output chip-sequence signal. The method then comprises the steps of transmitting the output chip-sequence signal as a radio wave, at a carrier frequency, over the communications channel, as a spread-spectrum signal and, translating, at a receiver, the spread-spectrum signal to a processing frequency as a received spread-spectrum signal. For acquisition, the received spread-spectrum signal is multiplied, at the processing frequency, by a header chip-sequence signal from the plurality of chip-sequence signals, with each chip-sequence signal having an identical chip sequence as the header chip-sequence signal, but with each chip-sequence signal having a delay of one-half or one chip, with each chip-sequence signal from the plurality of chip-sequence signals having a different delay from other chip-sequence signals. After acquisition, the received spread-spectrum signal is multiplied by the plurality of chip-sequence signals, with each chip-sequence signal from the plurality of $2^N$ chip-sequence signals having a different chip sequence from other chip-sequence signals in the plurality of chip-sequence signals, respectively. A plurality of products from the plurality of product devices are integrated during a period of a chip-sequence signal, and a largest value is selected from the plurality of integrators. The largest value from a respective integrator of the plurality of integrators is decoded into N bits of interleaved data.

The invention preferably uses orthogonal or bi-orthogonal signaling to increase the processing gain. The result is a binary AM signal (BPSK) or a QPSK signal and, therefore, the waveform is not degraded by amplifier nonlinearities. Further, since only one waveform is sent and RAKE is employed in the receiver, multipath can be used to enhance performance.

It will be apparent to those skilled in the art that various modifications can be made to the technique to acquire synchronization in high data rate CDMA systems of the instant invention without departing from the scope or spirit of the invention, and it is intended that the present invention cover modifications and variations of the technique to acquire synchronization in high data rate CDMA systems provided they come within the scope of the appended claims and their equivalents.

I claim:

1. A spread-spectrum system for sending data over a communications channel, comprising:
   a forward-error-correction (FEC) encoder for encoding, with an FEC code, the data as FEC data;
   an interleaver, coupled to said FEC encoder, for interleaving the FEC data as interleaved data;
   a memory, coupled to said interleaver, for storing N bits of interleaved data as stored data, with N a number of bits in a symbol;
   a chip-sequence encoder, coupled to said memory, for selecting, responsive to the N bits of stored data, a chip-sequence signal from $2^N$ chip-sequence signals stored in said chip-sequence encoder, as an output chip-sequence signal of said chip-sequence encoder;
   a transmitter section, coupled to said chip-sequence encoder, for transmitting the output chip-sequence signal as a radio wave, at a carrier frequency, over said communications channel, as a spread-spectrum signal;
   a receiver section, coupled to said communications channel, for translating the spread-spectrum signal to a processing frequency as a received spread-spectrum signal;
   a plurality of product devices, coupled to said receiver section, for multiplying, at the processing frequency, for acquisition, the received spread-spectrum signal by a header chip-sequence signal with each chip-sequence signal having an identical chip sequence as the header chip-sequence signal, each chip-sequence signal having a delay of one-half or one chip, relative to one another and having a different delay from other chip-sequence signals;
   said plurality of product devices for multiplying, after acquisition, the received spread-spectrum signal by the plurality of $2^N$ chip-sequence signals, with each chip-sequence signal from the plurality of $2^N$ chip-sequence signals having a different chip sequence from other chip-sequence signals in the plurality of $2^N$ chip-sequence signals, respectively;
   a plurality of integrators coupled to said plurality of product devices, respectively, for integrating a plurality of products from the plurality of product devices during a period of a chip-sequence signal thereby forming $2^N$ correlators;
   a comparator, coupled to said plurality of integrators, for selecting a largest value from the plurality of integrators;
   a chip-sequence decoder, coupled to said comparator, for decoding the largest value from a respective integrator of said plurality of integrators, into N bits of interleaved data;
   a deinterleaver, coupled to said chip-sequence decoder, for deinterleaving a series of interleaved bits from said chip-sequence decoder, as deinterleaved data; and
   a FEC decoder, coupled to said deinterleaver, for FEC decoding the deinterleaved data as estimated data.

2. An improvement to a spread-spectrum system for sending data over a communications channel, comprising:
   memory means for storing N bits of data as stored data, with N a number of bits in a symbol;
   chip-encoder means, coupled to said memory means, for selecting, responsive to the N bits of stored data, a chip-sequence signal from a plurality of $2^N$ chip-sequence signals stored in said chip-sequence encoder, as an output chip-sequence signal of said chip-encoder means;
   a transmitter section, coupled to said chip-encoder means, for transmitting the output chip-sequence signal as a radio wave, at a carrier frequency, over said communications channel, as a spread-spectrum signal;
   a receiver section, coupled to said communications channel, for translating the spread-spectrum signal to a processing frequency as a received spread-spectrum signal;
   spread-spectrum means, coupled to said receiver section, for processing, at the processing frequency, for acquisition, the received spread-spectrum signal by a header chip-sequence signal from the plurality of chip-sequence signals, with each chip-sequence signal of the plurality of chip-sequence signals set for having an identical chip sequence as the header chip-sequence signal, each chip-sequence signal having a delay of one-half or one chip, with each chip-sequence signal from the plurality of chip-sequence signals having a different delay from other chip-sequence signals, said spread-spectrum means for processing, after acquisition, the received spread-spectrum signal by the plurality of chip-sequence signals with each chip-sequence signal from the plurality of chip-sequence signals having a different chip sequence from other chip-sequence signals in the plurality of chip-sequence signals, respectively;
   integrator means coupled to said spread-spectrum means, for integrating a plurality of output signals from said spread-spectrum means during a period of a chip-sequence signal;
   comparator means, coupled to said integrator means, for selecting a largest value from said integrator means; and
   chip-decoder means, coupled to said comparator means, for decoding the largest value from said integrator means into N bits of estimated data.

3. An improvement to a spread-spectrum system for sending data over a communications channel, comprising:
   a memory for storing N bits of data as stored data, with N a number of bits in a symbol;
   a chip-sequence encoder, coupled to said memory, for selecting, responsive to the N bits of stored data, a chip-sequence signal from a plurality of chip-sequence signals stored in said chip-sequence encoder, as an output chip-sequence signal;
   a transmitter section, coupled to said chip-sequence encoder, for transmitting the output chip-sequence signal as a radio wave, at a carrier frequency, over said communications channel, as a spread-spectrum signal;

a receiver section, coupled to said communications channel, for translating the spread-spectrum signal to a processing frequency as a received spread-spectrum signal;

a plurality of product devices, coupled to said receiver section, for multiplying, at the processing frequency, for acquisition, the received spread-spectrum signal by a header chip-sequence signal from the plurality of chip-sequence signals, with each chip-sequence signal of the plurality of chip-sequence signals set having an identical chip sequence as the header chip-sequence signal, each chip-sequence signal having a delay of at most one chip, with each chip-sequence signal from the plurality of chip-sequence signals having a different delay from other chip-sequence signals, said plurality of product devices for multiplying, after acquisition, the received spread-spectrum signal by the plurality of chip-sequence signals, with each chip-sequence signal from the plurality of chip-sequence signals having a different chip sequence from other chip-sequence signals in the plurality of chip-sequence signals, respectively;

a plurality of integrators coupled to said plurality of product devices, respectively, for integrating a plurality of products from the plurality of product devices during a period of a chip-sequence signal;

a comparator, coupled to said plurality of integrators, for selecting a largest value from the plurality of integrators; and a chip-sequence decoder, coupled to said comparator, for decoding the largest value from a respective integrator of said plurality of integrators, into N bits of interleaved data.

4. A spread-spectrum method improvement for sending data over a communications channel, comprising the steps of:

storing, at a transmitter, N bits of interleaved data as stored data, with N a number of bits in a symbol;

selecting, at said transmitter in response to the N bits of stored data, a chip-sequence signal from a plurality of $2^N$ chip-sequence signals, as an output chip-sequence signal;

transmitting, at said transmitter, the output chip-sequence signal as a radio wave, at a carrier frequency, over said communications channel, as a spread-spectrum signal;

translating, at a receiver, the spread-spectrum signal to a processing frequency as a received spread-spectrum signal;

multiplying, at the processing frequency, for acquisition, the received spread-spectrum signal by a header chip-sequence signal from the plurality of chip-sequence signals, with each chip-sequence signal of the plurality of $2^N$ chip-sequence signals set for having an identical chip sequence as the header chip-sequence signal, each chip-sequence signal having a delay of at most one chip, with each chip-sequence signal from the plurality of chip-sequence signals having a different delay from other chip-sequence signals;

multiplying, after acquisition, the received spread-spectrum signal by the plurality of chip-sequence signals, with each chip-sequence signal from the plurality of chip-sequence signals having a different chip sequence from other chip-sequence signals in the plurality of chip-sequence signals, respectively;

integrating a plurality of products from the plurality of product devices during a period of a chip-sequence signal;

selecting a largest value from the plurality of integrators; and decoding the largest value from a respective integrator of said plurality of integrators into N bits of interleaved data.

\* \* \* \* \*